United States Patent
Jeong et al.

(10) Patent No.: US 8,023,379 B2
(45) Date of Patent: Sep. 20, 2011

(54) DEFECT INSPECTION METHOD AND DISK DRIVE USING SAME

(75) Inventors: Seung-youl Jeong, Hwaseong-si (KR); Se-hyun Kim, Suwon-si (KR); Jae-deog Cho, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 342 days.

(21) Appl. No.: 12/417,698

(22) Filed: Apr. 3, 2009

(65) Prior Publication Data
US 2009/0252012 A1 Oct. 8, 2009

(30) Foreign Application Priority Data
Apr. 3, 2008 (KR) .................. 10-2008-0031372

(51) Int. Cl.
*G11B 5/09* (2006.01)

(52) U.S. Cl. ............... 369/53.41; 369/47.53; 360/59

(58) Field of Classification Search .................. None
See application file for complete search history.

(56) References Cited

U.S. PATENT DOCUMENTS

| | | | |
|---|---|---|---|
| 6,526,014 B2 * | 2/2003 | Masaki et al. | 369/47.53 |
| 7,738,206 B1 * | 6/2010 | Lin et al. | 360/59 |

FOREIGN PATENT DOCUMENTS

| | | |
|---|---|---|
| JP | 10083501 A | 3/1998 |
| JP | 10105901 A | 4/1998 |
| JP | 2002175601 A | 6/2002 |
| JP | 2006172590 A | 6/2006 |

* cited by examiner

*Primary Examiner* — Muhammad N Edun
(74) *Attorney, Agent, or Firm* — Volentine & Whitt, PLLC

(57) ABSTRACT

Provided are a disk defect inspection method and apparatus. The defect inspection method includes; determining an independent recording density value for disk defect detection in relation to disk drive component factors excepting a disk of the disk drive, and performing a disk defect inspection using the independent recording density value for disk defect detection.

19 Claims, 4 Drawing Sheets

DEFECT INSPECTION METHOD AND DISK DRIVE USING SAME

CROSS-REFERENCE TO RELATED APPLICATIONS

This application claims the benefit of Korean Patent Application No. 10-2008-0031372, filed on Apr. 3, 2008, the subject matter of which is hereby incorporated by reference.

BACKGROUND

The invention relates to a method and apparatus for inspecting the recording medium of a disk drive. More particularly, the invention relates to a method and apparatus for enhancing accuracy in a disk defect detection process.

The hard disk drive (HDD) is a data storage device adapted to the recording and reproduction of data using a magnetic head. The data storage capacity, device integration density and physical miniaturization of conventional HDDs have all increased during recent years. Data recording density in a direction of disk rotation may be expressed using a bits per inch (BPI) value. Data recording density in a radial direction across the disk may be expressed using a tracks per inch (TPI) value. However expressed, data recording density has increased dramatically in contemporary HDDs. As a result, ever finer and more delicate mechanisms are required to read data that has been recorded with greatly increased density on the most recent HDDs.

The "disk" recording medium used in a HDD will typically include normal and defective regions. Data written to some physically defective regions will be reproduced with signals having reduced amplitude and/or degraded signal to noise ratio, as compared with signals resulting from normal data reads. At some point, the coherency of the data signals resulting from data read operations to defective disk regions can not be ensured. Accordingly, a disk defect inspection must be performed during the process of manufacturing an HDD in order to ensure the performance quality of the HDD.

SUMMARY

Embodiments of the invention provide a defect inspection method that selects a recording density that minimizes signal noise from data read operations to a disk in a HDD.

In one embodiment, the invention provides a defect inspection method comprising; determining an independent recording density value for disk defect detection in relation to disk drive component factors excepting a disk of the disk drive, and performing a disk defect inspection using the independent recording density value for disk defect detection.

In another embodiment, the invention provides a disk drive comprising; a disk adapted to store data, a magnetic head writing a test pattern data to a test area on the disk during a write operation, and reading the test pattern data from the test area to generate a corresponding test pattern signal during a read operation, an automatic gain control (AGC) circuit controlling a gain value in accordance with the magnitude of a corresponding test pattern signal, and a controller controlling the magnetic head during a plurality of write operations, each write operation being performed in relation to one of a plurality of recording density values, and during a plurality of read operations, each read operation being performed after a corresponding one of the plurality of write operations to generate a corresponding test pattern signal, and selecting one of the plurality of recording density values as an independent recording density value in relation to a corresponding test pattern signal and AGC circuit gain value, wherein the independent recording density value is subsequently used during a disk defect inspection.

BRIEF DESCRIPTION OF THE DRAWINGS

Exemplary embodiments will be described with reference to the accompanying drawings in which.

DESCRIPTION OF EMBODIMENTS

Embodiments of the invention will now be described with reference to accompanying drawings. However, the invention may be variously embodied and should not be construed as being limited to only the illustrated examples.

A hard disk drive (HDD) is generally implemented by combining various electrical circuit(s) and a head disk assembly (HDA) including related mechanical components.

Figure 1:
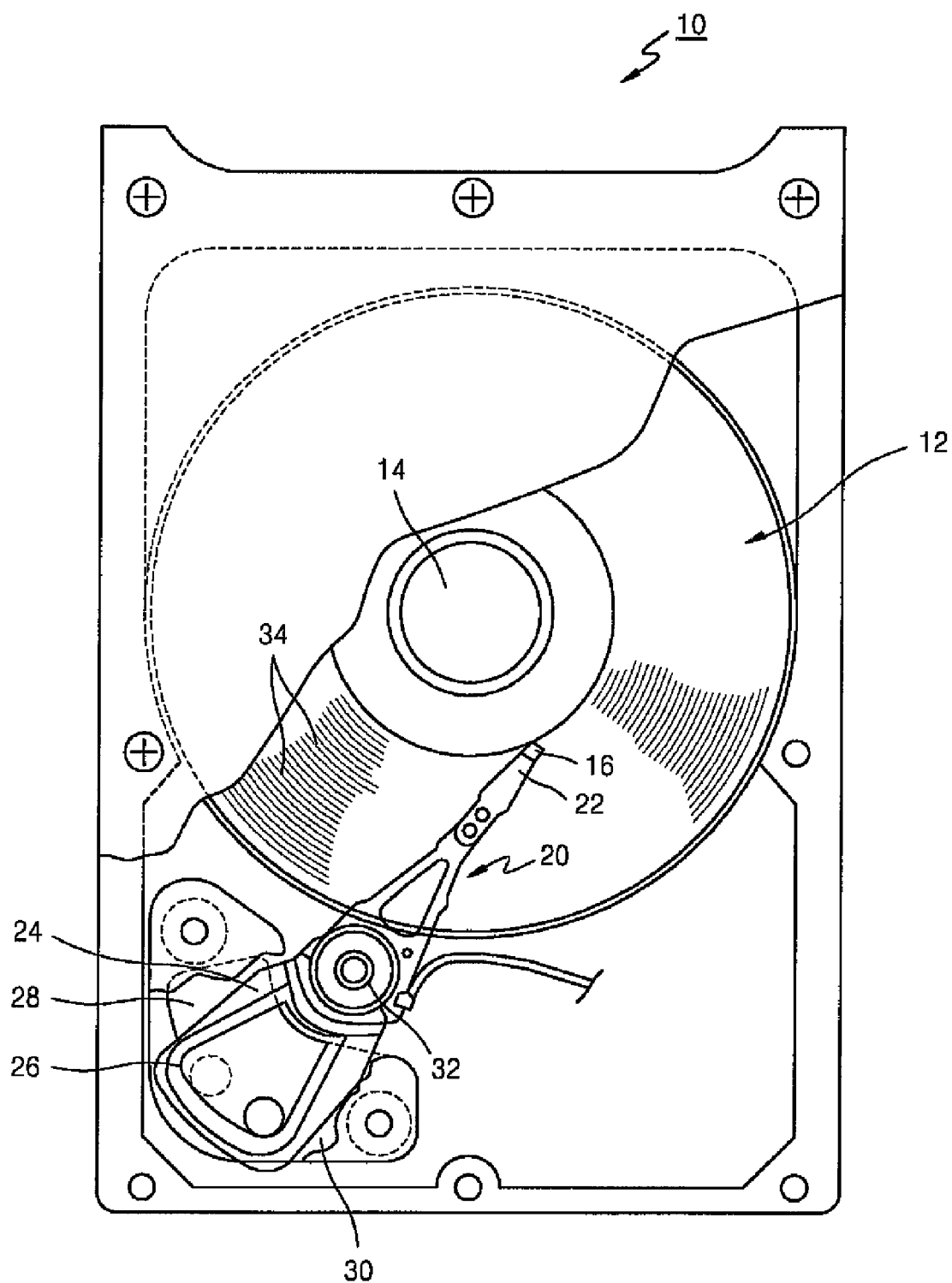
FIG. 1 is a plan view illustrating a head disk assembly of a hard disk drive (HDD) according to an embodiment of the invention.

Figure (FIG.) 1 illustrates the major mechanical components of a HDA 10 in a HDD according to an embodiment of the invention. Referring to FIG. 1, the HDA 10 includes at least one magnetic disk 12 rotated by a spindle motor 14, and a transducer (not shown) disposed close to a surface of the disk 12.

The transducer detects a magnetic field of the disk 12 and magnetizes the disk 12, thereby enabling the recording and reproduction of information. The transducer is described as a singular item but it should be understood that the transducer may include a write transducer (also called 'a writer') for magnetizing the disk 12, and a separate read transducer (also called 'a reader') for detecting the magnetic field of the disk 12. The read transducer may be formed from a magneto-resistive (MR) element.

The transducer may be integrated into a magnetic head 16. The magnetic head 16 is configured to generate an air bearing between the transducer and the surface of the disk 12. The magnetic head 16 is integrated into a head stack assembly (HSA) 22 which is attached to an actuator arm 24 having a voice coil 26. The voice coil 26 is disposed close to a magnetic assembly 28 so as to excite a voice coil motor (VCM) 30. A current supplied to the voice coil 26 generates a torque rotating the actuator arm 24 with respect to a bearing assembly 32. The rotation of the actuator arm 24 enables the transducer to traverse the surface of the disk 12.

Information is stored in a plurality of concentric tracks 34 of the disk 12. Each of the tracks 34 generally includes a plurality of sectors. Each of the sectors includes a data field and a servo field. In the servo field, a preamble, a servo address/index mark (SAM/SIM), a gray code, and a burst signal are recorded. The transducer traverses the surface of the disk 12 so as to read or write information in the tracks 34.

Figure 2:
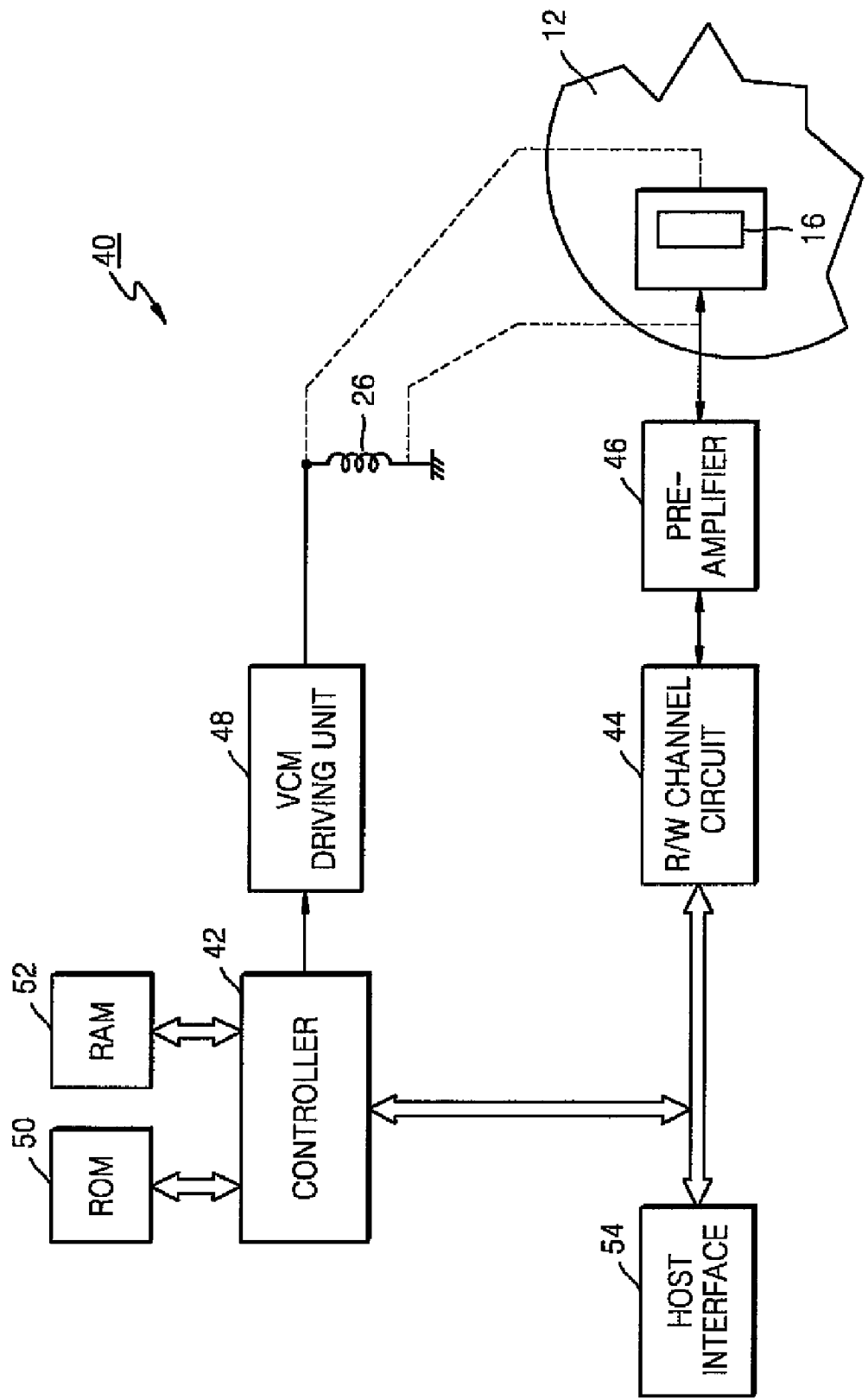
FIG. 2 is a block diagram illustrating an electrical system for controlling the HDD of FIG. 1, according to an embodiment of the invention.

FIG. 2 is a block diagram illustrating the major components of an electrical system 40 for controlling the HDD of FIG. 1, according to an embodiment of the invention. Referring to FIG. 2, the electric system 40 includes a controller 42 connected to the magnetic head 16 by a read/write (R/W) channel circuit 44 and a pre-amplifier 46.

The controller 42 may be a digital signal processor (DSP), a microprocessor, a microcontroller, or the like. The controller 42 receives a command from a host apparatus (not shown) via a host interface 54, and controls the R/W channel circuit 44 so as to read information from the disk 12 or to write information to the disk 12.

The controller 42 is also connected to a voice coil motor (VCM) driving unit 48 supplying a driving current to the voice coil 26, and transmits a control signal to the VCM driving unit 48 so as to control a movement of the magnetic head 16.

Figure 4:
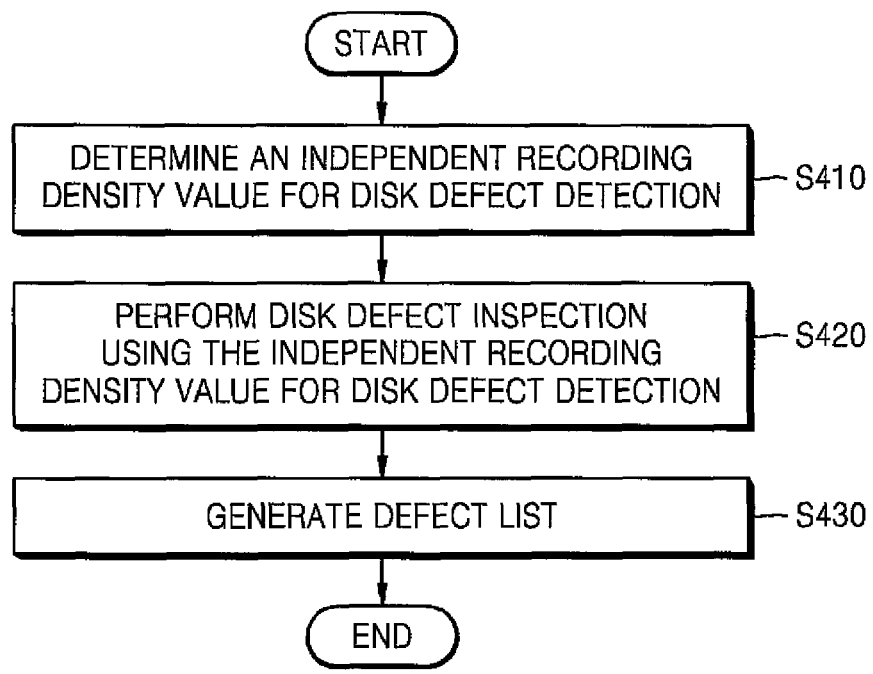
FIG. 4 is a flowchart of a defect inspection method according to an embodiment of the invention.
Figure 5:
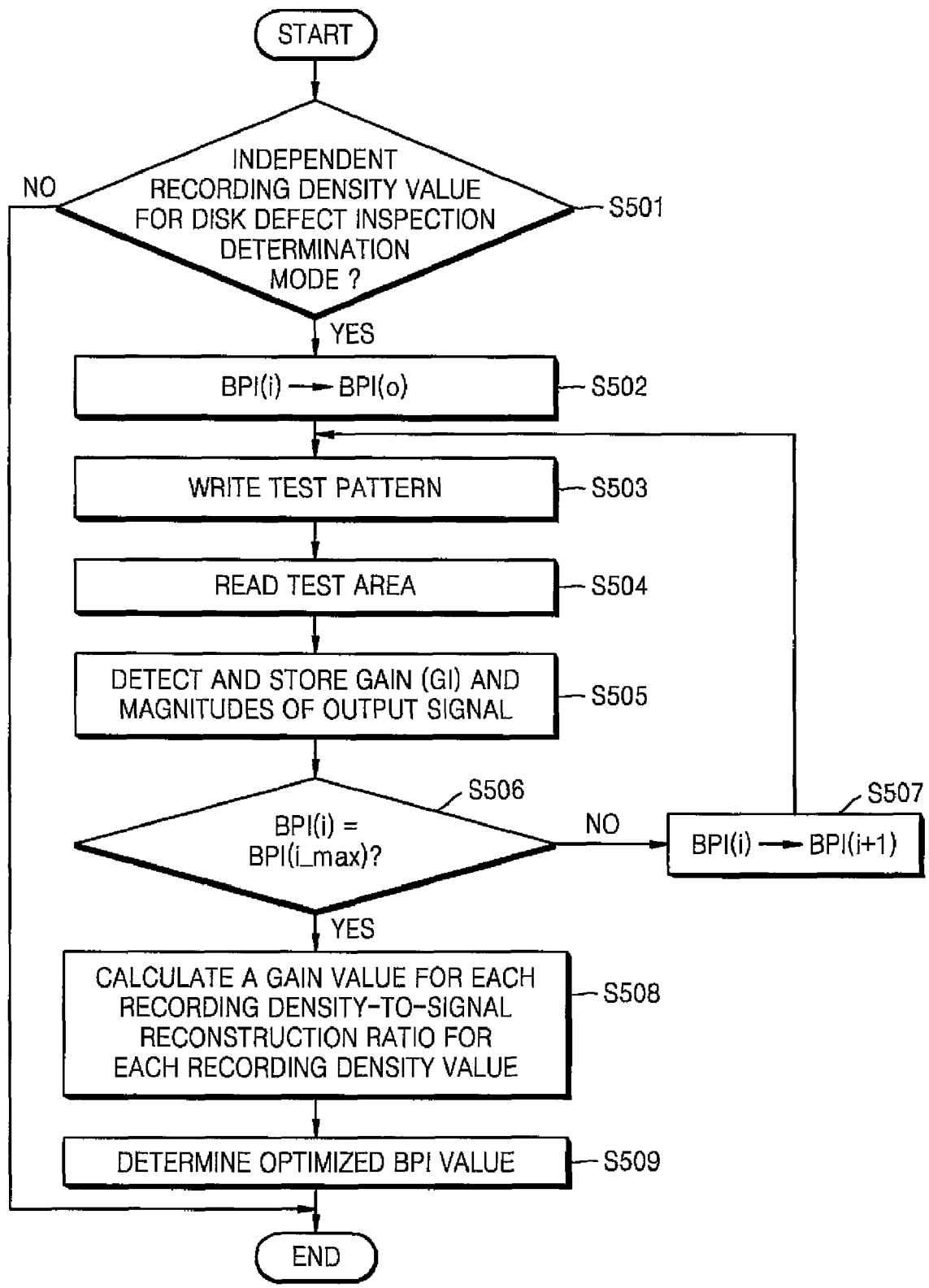
FIG. 5 is a flowchart summarizing a method of determining a recording density for disk defect inspection according to an embodiment of the invention.

Firmware and various kinds of control data for controlling the HDD are stored in a read-only memory (ROM) 50. Also, program codes and information for performing a defect inspection method to be described later with reference to FIGS. 4 and 5 are stored in the ROM 50.

When power is supplied to the HDD, a plurality of pieces of disk drive information read from a maintenance cylinder (also called 'a system cylinder) area of the disk 12 are loaded to a random access memory (RAM) 52. In particular, defect list information is stored in the maintenance cylinder area.

Next, the general operation of the HDD of FIGS. 1 and 2 will be described.

In a data read mode, the HDD amplifies an electric signal, detected from the disk 12 by the magnetic head 16, by using a gain value fixed in the pre-amplifier 46. After that, the R/W channel circuit 44 amplifies a signal output from the pre-amplifier 46 by using an automatic gain control (AGC) circuit automatically varying a gain according to a signal magnitude, converts the signal into a digital signal, and performs a decoding process, thereby detecting data. The controller 42 performs an error correction process on the detected data by using Reed-Solomon codes, converts the detected data into stream data, and transmits the stream data to a host apparatus (not shown) via the host interface 54.

Next, in a data write mode, the HDD receives data from the host apparatus (not shown) via the host interface 54, the controller 42 adds a parity symbol for error correction according to the Reed-Solomon codes to the data, the R/W channel circuit 44 encodes the data to be suitable for a recording channel, and the data is recorded to the disk 12 via the magnetic head 16 by using a recording current amplified by the pre-amplifier 46.

Figure 3:
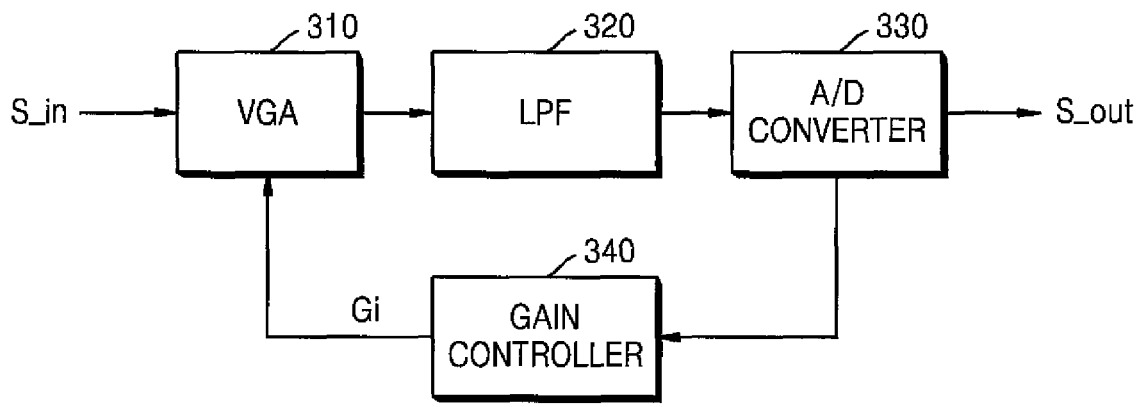
FIG. 3 is a block diagram illustrating an automatic gain control (AGC) circuit according to an embodiment of the invention.

FIG. 3 is a block diagram illustrating in some additional detail the AGC circuit included in the R/W channel circuit 44 according to an embodiment of the invention.

Referring to FIG. 3, the AGC circuit includes a variable gain amplifier 310, a low pass filter (LPF) 320, an analog-to-digital transducer 330, and a gain controller 340.

The variable gain amplifier 310 amplifies a signal S_in input from the pre-amplifier 46 by a defined gain value Gi generated by the gain controller 340, and outputs a signal to the LPF 320.

The LPF 320 passes low frequency components of the signal output from the variable gain amplifier 310, and blocks high frequency noise.

The analog-to-digital transducer 330 converts an analog signal output from the LPF 320 into a digital signal, and outputs the digital signal.

The gain controller 340 receives the digital signal output from the analog-to-digital transducer 330, and controls the gain value Gi of the variable gain amplifier 310 according to a magnitude of the digital signal input to the gain controller 340. That is, when the magnitude of the input digital signal is less than a target value, the gain value Gi is increased. However, when the magnitude of the input digital signal is greater than the target value, the gain value Gi is decreased. Thus, the gain value Gi is inversely proportional to the magnitude of the signal input to the variable gain amplifier 310.

In particular, when the magnitude of the signal input to the variable gain amplifier 310 is very small, even if the gain value Gi of the variable gain amplifier 310 is maximized, a magnitude of the digital signal output from the analog-to-digital transducer 330 may be less than the target value.

The controller 42 in the illustrated embodiment controls the recording and reproduction of a test pattern while a plurality of recording density values are varied, determines a recording density value for disk defect inspection according to the gain value Gi generated by the gain controller 340 of the AGC circuit illustrated in FIG. 3 while the test pattern is reproduced, and controls the performing of a disk defect inspection using the determined recording density value for disk defect inspection.

Also, the controller 42 may determine the recording density value for a disk defect inspection in relation to the gain value Gi-to-signal reconstruction ratio, wherein the gain value Gi of the gain value Gi-to-signal reconstruction ratio corresponds to the gain value Gi generated by the gain controller 340 of the AGC circuit. Also, the controller 42 may determine the recording density value for the disk defect inspection according to a gain value Gi-to-output signal S_out magnitude, wherein the output signal S_out is output from the AGC circuit.

The independent recording density value for the disk defect inspection may be separately determined, regardless of a recording density value used during data read/write operation conducted according to one or more conditions or component factors. That is, regardless of a recording density value established at the time of manufacture, or during read/write operations, the independent recording density value associated with the disk defect inspection routine may be specifically identified to run certain test or diagnostic process(es) for the HDD, such as defective disk area identification.

In one embodiment of the invention, the independent recording density value for disk defect inspection is expressed in terms of a bits per inch (BPI) value, and is determined in relation to a frequency used to process data in a read/write channel. As described above, the read/write data channel is on electrical component within HDDs.

In certain embodiments, the test pattern used during the disk defect inspection is a conventionally understood 2T pattern. However, the invention is not limited thereto, and a test pattern signal resulting from some other type of test pattern may also be used during determination of the independent recording density value in relation to a plurality of recording density values.

After the disk defect inspection is ended, the controller 42 ensures that a proper recording density value is restored for use during data read/write operations according to the anticipated operating conditions of the HDD.

FIG. 4 is a flowchart summarizing a disk defect inspection method using the controller 42 according to an embodiment of the invention.

First, a recording density value for disk defect detection in a disk drive is independently determined in relation to the recording density value used in read/write data from/onto the disk (S410). Thus an "independent recording density value" is determined regardless of any previously used "read/write recording density value." In one regard, the independent recording density value is made in relation to current HDD user or operating conditions. Such current operating conditions take into consideration various HDD "component factors" excepting only certain factors related to disk 12. Hence, the independent recording density value for disk defect detection is determined by considering factors or influences related to the electrical and mechanical components forming the HDD, except for the disk 12. For example, one HDD component that may greatly influence a defect detection routine in a HDD is the magnetic head 16. Thus, in order to reduce the influence of the magnetic head 16 as much as possible, the defect inspection method according to the illustrated embodiment determines an independent recording density value for disk defect detection, wherein the independent recording density value is a value by which a signal from a 2T pattern is correctly maintained without being distorted when the 2T pattern is used as a test pattern in a normal disk area during a read/write operation. A more detailed explanation of one approach to determining the independent recording density value for disk defect detection will be described hereafter with reference to a flowchart of FIG. 5.

Next, a disk defect inspection routine is performed using the independent recording density value for disk defect detection as determined above (S420). That is, regardless of the frequency used during data read/write operations, or a recording density value established by an HDD at manufacture or during previous operation, the test pattern is recorded using a frequency defined in relation to the independent recording density value. Thus, when a magnitude of a test pattern reproduced while reading an area having a previously recorded test pattern is less than a defined threshold value, said data area may be determined to be a defect area. Here, the 2T pattern is used as the test pattern, and the threshold value may be an experimentally and statistically obtained reference value by which a normal data area and a data area having a defect are discriminated.

By performing the disk defect inspection routine, a defect list is generated (S430), wherein the defect list includes disk position information with respect to areas detected during the disk defect inspection routine. The defect list may be stored in a maintenance cylinder area of the disk 12. During subsequent data write operations, the defect list may be used to prevent data from being written into a defective area.

FIG. 5 is a flowchart summarizing a method of determining the independent recording density value for a disk defect inspection, such as the one performed in operation S410 of FIG. 4, according to an embodiment of the invention.

The controller 42 first determines whether the disk drive has been switched into an independent recording density value determination mode (S501). The independent recording density value for disk defect inspection determination mode is used to determine an optimized recording density value separately applied to a disk defect inspection before the disk defect inspection is performed.

Once in the independent recording density value determination mode (S501=yes), the controller 42 sets a bits per inch value or BPI(i) value to an initial recording density value or BPI(0) (S502). Here, the initial BPI(0) value indicates a minimum recording density value that may be used for the disk defect inspection. For reference, embodiments of the invention may preset a plurality of recording density values (e.g., BPI(0), BPI(1), BPI(2), . . . , and BPI(i_max)) potentially available for the disk defect inspection. The control 42 may then select one of the plurality of recording density values that is most suitable for the contemplated disk defect inspection.

Next, a test pattern is written to a test area identified within the disk 12 (S503). The illustrated embodiment assumes the conventionally understood 2T test pattern as the test pattern.

After the test pattern is written to the test area, the test pattern is then read from the test area (S504).

From the read test pattern recorded in the test are, gain values Gi associated with (or controlled by) the AGC circuit, and magnitudes of a resulting output signal for the AGC circuit are detected and stored (S505).

After the gain values and output signal magnitude are stored, a determination is made as to whether the "current BPI(i) value" (i.e., the BPI(i) value currently establishing a recording density value in the HDD during the disk defect inspection) corresponds to the maximum BPI(i_max) value (S506).

If the current BPI(i) value is not the maximum BPI(i_max), the current BPI(i) is incremented (S507) and the test pattern write/read/detection loop is repeated. However, once the current BPI(i) reaches the maximum BPI(i_max), a gain value for each recording density-to-signal reconstruction ratio associated with each one of the plurality of recording density values is calculated using the values derived by the write/read/detect loop (S508). A gain value for each recording density as indicated by a recording density-to-signal reconstruction ratio for each recording density value means the gain value Gi generated in the AGC circuit in relation to each one of the plurality of recording density BPI(i) values.

To be more specific, the gain value for each recording density is obtained by calculating an average value for a plurality of gain values Gi which are detected in the AGC circuit for each one of the plurality of recording density BPI(i) values. Next, a reconstruction ratio for each recording density of the gain value for each recording density-to-signal reconstruction ratio for each recording density is calculated by comparing a target magnitude of an output signal of the AGC circuit with a magnitude of an actual output signal of the AGC circuit. The magnitude of the actual output signal of the AGC circuit means an average value of the output signal magnitudes which are detected in the AGC circuit and which are stored during operation S505. After that, the reconstruction ratio for each recording density is divided by the gain value for each recording density so that the gain value for each recording density-to-signal reconstruction ratio for each recording density is calculated.

Finally, an optimized BPI value is determined according to the gain value for each recording density-to-signal reconstruction ratio for each calculated recording density (S509). For example, the optimized BPI value may be a BPI value which is used to generate a gain value-to-signal reconstruction ratio which is closest to a target value from among the gain values for recording density-to-signal reconstruction ratio for each recording density. Here, the target value may be defined as the most suitable value for minimizing influence of the magnetic head 16 during the disk defect detection routine. The target value may be statistically obtained using experimental data.

An explanation of one possible method for determining an optimized BPI value follows.

A difference value between an initial target value and the gain value for each recording density-to-signal reconstruction ratio associated with each recording density is calculated. Then, one of the calculated difference values for among the plurality of calculated difference values associated with each recording density may identified as a minimum value. In this manner, one of the plurality of recording density values may be determined to be the proper recording density value for disk defect detection.

In one embodiment of the invention, the optimized BPI value is determined according to the gain value for each recording density-to-signal reconstruction ratio for each recording density. However, according to other embodiments of the invention, the optimized BPI value may be determined using only the gain value for each recording density of the AGC circuit. That is, in this case, a recording density having a gain value which is closest to a target gain value and which is from among gain values calculated for each recording density may be determined as the recording density value for disk defect detection.

Also, the optimized BPI value may be determined according to a value obtained by dividing the magnitudes of the output signal of the AGC circuit for each recording density by the gain value of the AGC circuit. That is, in this case, a recording density generating a calculation value which is from among calculation values obtained by dividing the magnitudes of the output signal of the AGC circuit for each recording density by the gain value of the AGC circuit and which is closest to a target value may be determined as the recording density value for disk defect detection.

The invention is not limited thereto and an optimized recording density for disk defect inspection may be determined using various techniques, according to the gain values and the magnitudes of the output signal generated in the AGC circuit for each recording density.

The determined recording density value for disk defect inspection is used only when the disk defect inspection is performed. After the disk defect inspection is complete, a recording density value originally set in the disk drive is restored.

The invention can be implemented as a method, an apparatus, and a system. When the invention is implemented in software, its component elements are code segments that execute necessary operations. Programs or code segments can be stored in processor readable media and can be transmitted via a computer data signal that is combined with a carrier wave in a transmission medium or in a communication network. The processor readable media can be any media that can store or transmit data. Examples of the processor readable media include electronic circuits, semiconductor memory devices, ROMs, flash memories, erasable ROMs (EROMs), floppy disks, optical disks, hard disks, optical fibers, radio frequency (RF) networks, etc. The computer data signal can be any signal that can be transmitted via transmission media, such as electronic network channels, optical fibers, air, an electronic field, RF networks, etc.

While the invention has been particularly shown and described with reference to exemplary embodiments thereof, it will be understood that various changes in form and details may be made therein without departing from the scope of the following claims.

What is claimed is:

1. A defect inspection method comprising:
   determining an independent recording density value for disk defect detection in relation to disk drive component factors excepting a disk of the disk drive; and
   performing a disk defect inspection using the independent recording density value for disk defect detection.

2. The defect inspection method of claim 1, wherein the independent recording density value for disk defect detection is determined regardless of a recording density value used by the disk drive during previous read/write operations.

3. The defect inspection method of claim 1, wherein the independent recording density value for disk defect detection comprises a bits per inch (BPI) value.

4. The defect inspection method of claim 1, wherein the independent recording density value for disk defect detection is determined in relation to a frequency used to process data in a read/write channel of the disk drive.

5. The defect inspection method of claim 1, wherein determining the independent recording density value for disk defect detection comprises:
   for a current recording density value among a plurality of recording density values, writing a test pattern to a test area of the disk;
   reading the test area to obtain a reproduced test pattern signal;
   calculating a gain value-to-signal reconstruction ratio for the reproduced test pattern signal corresponding to the current recording density value; and
   incrementing the current recording density value to a maximum recording value.

6. The defect inspection method of claim 5, further comprising:
   after calculating a gain value associated with each value-to-signal reconstruction ratio for a reproduced test pattern signal corresponding to each one of the plurality of recording density values, determining an optimized one of the plurality of recording density values in relation to a gain value associated with a value-to-reconstruction ratio value closest to a defined initial target value.

7. The defect inspection method of claim 6, wherein each gain value of each gain value-to-signal reconstruction ratio is the gain value of an automatic gain control (AGC) circuit amplifying a gain that varies in accordance with the magnitude of a corresponding reproduced test pattern signal.

8. The defect inspection method of claim 1, wherein determining the independent recording density value for disk defect detection comprises:
   for each one of a plurality of recording density values, writing a test pattern in a test area;
   detecting a gain value for an automatic gain control (AGC) circuit, wherein the gain varies in accordance with a magnitude of a test pattern signal reproduced by reading the test area; and
   determining in relation to the plurality of recording density values and corresponding gains an optimum gain value closest to an initial target value.

9. The defect inspection method of claim 1, wherein determining the independent recording density value for disk defect detection comprises:
   sequentially writing a test pattern in relation to a plurality of recording density values;
   for each one of the plurality of recording density values, measuring a gain value associated with a value-to-output signal magnitude ratio, wherein the gain value corresponds to a gain of an automatic gain control (AGC) circuit that varies in accordance with a magnitude of a test pattern signal reproduced for the recording density value by reading the written test pattern, wherein the output signal magnitude of the gain value-to-output signal magnitude ratio is the magnitude of the signal output by the AGC circuit; and
   determining one of the plurality of recording density values to be the independent recording density value for disk defect detection, wherein the independent recording density value corresponds to a gain value associated with a value-to-output signal magnitude ratio closest to an initial target value.

10. The defect inspection method of claim 1, further comprising:
   writing a test pattern to a test area of the disk, generating a test pattern signal by reading the test pattern from the test area, and determining whether the test area is a defective area of the disk when a magnitude of the test pattern is less than a threshold value.

11. The defect inspection method of claim 10, further comprising:
generating a defect list indicating one or more defective areas of the disk identified by performing the disk defect inspection.

12. The defect inspection method of claim 11, further comprising:
restoring a recording density value for use during read/write operations according to defined operating conditions.

13. A disk drive comprising:
a disk adapted to store data;
a magnetic head writing a test pattern data to a test area on the disk during a write operation, and reading the test pattern data from the test area to generate a corresponding test pattern signal during a read operation;
an automatic gain control (AGC) circuit controlling a gain value in accordance with the magnitude of a corresponding test pattern signal; and
a controller controlling the magnetic head during a plurality of write operations, each write operation being performed in relation to one of a plurality of recording density values, and during a plurality of read operations, each read operation being performed after a corresponding one of the plurality of write operations to generate a corresponding test pattern signal, and selecting one of the plurality of recording density values as an independent recording density value in relation to a corresponding test pattern signal and AGC circuit gain value, wherein the independent recording density value is subsequently used during a disk defect inspection.

14. The disk drive of claim 13, wherein the independent recording density value for disk defect inspection is determined in relation to a frequency used to process data in a read/write channel of the HDD.

15. The disk drive of claim 13, wherein the controller determines a recording density value as the recording density value for disk defect detection when the gain value of the AGC circuit is used to generate the recording density value closest to an initial target value.

16. The disk drive of claim 13, wherein the controller determines the recording density value for disk defect inspection according to a gain value-to-signal reconstruction ratio, wherein the gain value of the gain value-to-signal reconstruction ratio corresponds to the gain value of the AGC circuit while the test pattern is reproduced.

17. The disk drive of claim 13, wherein the controller determines the recording density value for disk defect inspection according to a gain value-to-output signal magnitude ratio, wherein the gain value of the gain value-to-output signal magnitude ratio corresponds to the gain value of the AGC circuit while the test pattern is reproduced and the output signal magnitude of the gain value-to-output signal magnitude ratio is the magnitude of the signal output from the AGC circuit.

18. The disk drive of claim 13, wherein the disk defect inspection comprises recording the test pattern to the disk by using the recording density value for disk defect inspection, reproducing an area having recorded thereon the test pattern, and determining a data area as a defect area when a magnitude of the reproduced test pattern is less than a threshold value in the data area.

19. The disk drive of claim 13, wherein the controller restores the recording density value of the disk drive to a recording density value used in data reading/writing according to a user condition.

* * * * *